United States Patent

Kilgore

[15] 3,667,012
[45] May 30, 1972

[54] ELECTRICAL APPARATUS WITH FREQUENCY CONTROLLED LOAD COMPENSATION

[72] Inventor: Lee A. Kilgore, Export, Pa.

[73] Assignee: Westinghouse Electric Corporation, Pittsburgh, Pa.

[22] Filed: July 31, 1970

[21] Appl. No.: 59,949

[52] U.S. Cl. ............................... 318/161, 318/197, 318/237
[51] Int. Cl. ....................................................... H02k 7/02
[58] Field of Search .................. 318/161, 197, 227, 237, 150

[56] References Cited

UNITED STATES PATENTS

| | | | |
|---|---|---|---|
| 2,213,945 | 9/1940 | Alexanderson | 318/197 X |
| 2,707,258 | 4/1955 | Boyer et al. | 318/197 |
| 3,059,162 | 10/1962 | Humphrey | 318/197 |

Primary Examiner—Gene Z. Rubinson
Attorney—A. T. Stratton, F. P. Lyle and G. H. Telfer

[57] ABSTRACT

A wound rotor motor and a flywheel are provided on a shaft with speed control of the motor by frequency control on its secondary applied by means such as a cycloconverter that is responsive to pulsating load conditions on the system. Power flows from the flywheel into the system during periods of high load and into the flywheel during periods of low motoring load or a regenerative load. The invention permits use of equipment, such as large excavators, that have sharply varying loads in their duty cycles, in locations where there are small, otherwise inadequate, power systems.

4 Claims, 3 Drawing Figures

Patented May 30, 1972

3,667,012

INVENTOR
Lee A. Kilgore
ATTORNEY

ELECTRICAL APPARATUS WITH FREQUENCY CONTROLLED LOAD COMPENSATION

BACKGROUND OF THE INVENTION

1. Field of the Invention

The invention relates generally to A.C. power systems and particularly to apparatus to compensate for sharply varying loads on such systems.

2. Description of the Prior Art and Problems to be Solved

Some electrically powered equipment characteristically has large peak power consumption but of a rapidly varying nature over the typical duty cycle. Steel mills and large excavators (draglines) are examples of such equipment. In highly industrialized countries, the power systems are normally adequate to sustain such loads without serious disturbance. However there are locations where small power systems are subject to severe voltage fluctuations and frequency disturbances as a result of such loads. In the less well developed countries, where the power systems tend to be small, it may be particularly desirable to operate equipment such as draglines.

An approach to the problem of voltage variations is to vary the reactive power flow as load power conditions change by varying the field excitation of the synchronous machines that are acting as loads. This requires power factor variation in the lagging direction that may reach the limits imposed by the pullout torque restrictions of the synchronous machines. Also, saturation of the motor iron and thermal limitations on the motor field limit the amount of leading reactive power that can be caused to flow. Thus the available degree of control of reactive power flow does not span the range of probable need nor does it control the flow of real power.

Variation in real power requirements of the load produces changes in the energy flow in the system generating station, and consequent speed changes. In a steam power plant, steam flow will change in an attempt to keep speed and frequency deviations small. A rapid acting governor capable of severe duty is required. However, the steam boilers are inherently too slow to respond to the type of loads in question, and there is danger of drawing water into the turbine and damaging it.

Load leveling might be achieved by operating several machines with the same type of load cycle on the site, so long as the various machines are run out of step with each other. Without controlled operation there would be encountered at some point a coincidence of peak loads and an aggravated form of the problem sought to be avoided. A computer operated supervisory control system could avoid such occurrences but would seldom be economically justified.

Improvement of the basic power system is the long range solution to the described problems but the need exists for economical solutions that a power consumer can employ without affecting the basic utility. Besides the technical problems associated with supplying rapidly varying loads is that even if the system is adequate to supply peak demand, there may be large "high demand" charges imposed by the utility.

By way of additional background, reference is made to the fact that the prior art shows some combinations of apparatus that include some form of load compensation by frequency control on the secondary of a wound rotor motor. For example, *Standard Handbook for Electrical Engineers*, 6th edition, 1933, Section 7–367, discloses that asynchronous condensers have been used in the past with A.C. commutator machines supplying the low frequency currents to the secondary of the wound rotor machine, mainly for the purpose of correcting phase angle or power factor. It is additionally acknowledged that cycloconverters have been used to generate low frequency A.C. for a few motor drives, for example as disclosed in *Standard Handbook for Electrical Engineers*, 8th edition, 1949, Section 7–318.

SUMMARY OF THE INVENTION

The invention resides in a combination of apparatus including an induction motor with means to apply electrical signals to a winding on the rotating member thereof (e.g., a wound rotor motor) and a mechanical energy storage device (e.g., a flywheel) driven by the motor and, by its inertia, tending to oppose speed change. The motor speed is more closely controlled by frequency varying signals applied to the rotor winding from means, such as a cycloconverter, electrically coupled to the power system so as to be responsive to pulsating load conditions on the system. Sustained motion of the flywheel provides power flowing into the system (i.e., the induction machine acts as a generator and power is developed on its primary stator windings) during periods of high load. Energy is transferred into the flywheel (i.e., the induction machine acts as a motor) during periods of low motoring load or a regenerative load. Additional means, such as a primary power factor regulator, is provided for amplitude control of the secondary current.

The invention is particularly advantageous in that it permits use of equipment, such as large excavators, that have sharply varying loads during normal duty cycles of approximately 1 minute in locations where there are small, otherwise inadequate, power systems or where utility charges for high demand periods are large.

While costs will vary for operation of particular types of equipment in particular locations, it can be shown that in some locations, particularly in the less well developed countries, the operation of four shovel-excavators (e.g., in open pit mining) having normally 36 megawatts of peak load, if reduced by this invention to 18 megawatts as seen by the power system can save enough in 2 years in utility billing to completely pay for the capital equipment necessary to implement this invention, in addition to providing greater reliability.

DESCRIPTION OF PREFERRED EMBODIMENTS

Figure 1:
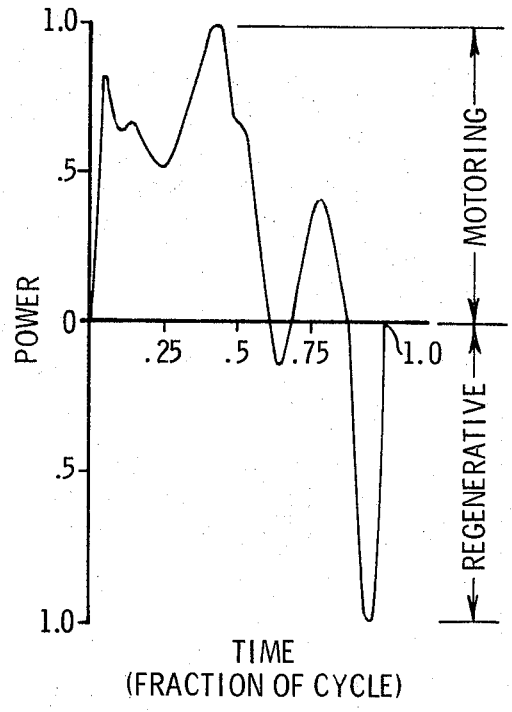
FIG. 1 is a curve of relative power demand against time for a single duty cycle for the type of equipment presenting problems to which the present invention is directed.

FIG. 1 shows a duty cycle curve of a load for which the present invention is particularly useful. On the vertical axis are fractions of peak power in both positive and negative directions and on the horizontal axis are fractions of the duty cycle duration. The curve is shaped characteristically for equipment such as excavators (sometimes called draglines). The basic digging cycle of such equipment involves three motions — drag, hoist, and swing — with differing load requirements. The curve of FIG. 1 results from intermittent operation of each motion and sometimes more than one motion at a time. During portions of the cycle above the zero value on the vertical axis there is demand on the power system, i.e., the equipment presents to the system a motoring load. During portions of the cycle below the zero value on the vertical axis there is a regenerative load presented to the system. The average motoring load is about 40 percent of the positive peak load. The negative peak load may be from about 60 percent to 100 percent of the positive peak. The duty cycle is approximately 1 minute or less. Representative machines may have a peak motoring load of 15,000 kilowatts and a duty cycle of 70 seconds. The curve of FIG. 1 is idealized; for example, it does not show higher frequency fluctuations characteristic of the synchronous machines normally used on the equipment in question.

The various problems encountered with equipment having load curves like that of FIG. 1 have been discussed hereinbefore, as well as the drawbacks of various alternative solutions.

Figure 2:
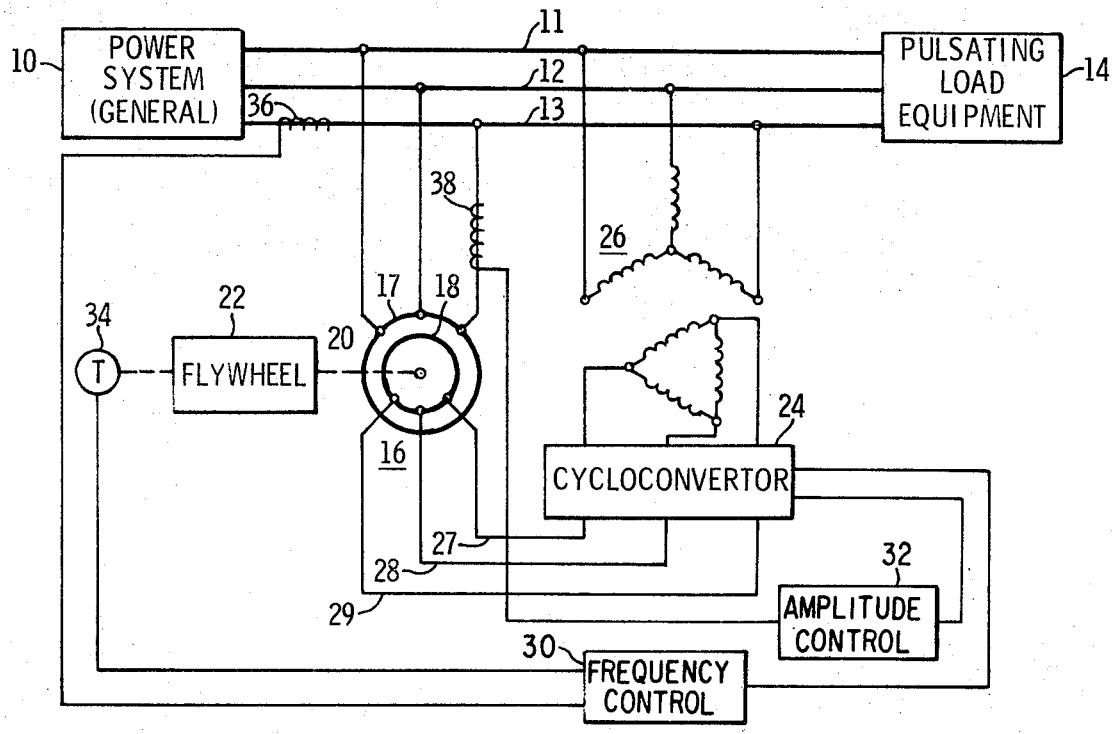
FIG. 2 is a schematic diagram of one embodiment of the present invention.

FIG. 2 shows an embodiment of the present invention. A three phase power system or generator 10 is connected by phase conductors 11, 12 and 13 to supply a piece of equipment 14 that operates in such a manner that it presents a pulsating load, such as like that of FIG. 1, to the power system 10.

An induction motor 16, that has phase windings on both its stator 17 and rotor 18 (e.g., a wound rotor motor), is connected (by the stator windings) to the phase conductors 11, 12 and 13 to be powered by the system 10. The rotor 18 is on a shaft 20 on which is also mounted a mechanical energy storage device represented by flywheel 22.

A cycloconverter 24 is coupled by three phase transformer 26 to the phase conductors 11, 12 and 13 and is also connected by conductors 27, 28 and 29 to the secondary windings (rotor 18) of motor 16.

The arrangement shown in FIG. 2 provides energy storage in the flywheel 22 during low load or regenerative load periods. The stored energy is made available as electrical power during high load periods. As far as the power system 10 is concerned, the load is leveled to within a suitable range.

Merely to have flywheel 22 to store available energy in mechanical form until required would not be likely to provide an adequate system without close control of the speed of rotor 18 that determines the energy pumped into and out of the flywheel 22. The purpose of cycloconverter 24 is to provide such control by static means, i.e., without requiring additional pieces of rotating equipment.

The cycloconverter 24 responds to the voltage and frequency of the power on phase conductors 11, 12 and 13 to provide a variable frequency voltage to the rotor 18. The wound rotor motor 16 is influenced by two separately obtained magnetic fields. A magnetic field is established by the machine stator 17 and rotates in synchronism with the line supply frequency. Another rotating magnetic field is set up in the rotor, rotating in synchronsim with the variable frequency supply from cycloconverter 24.

Under normal conditions, the rotor 18 will mechanically rotate in such a direction and at such velocity that the two magnetic fields are locked together. If $W_s$ is the angular velocity of the stator field and $W_r$ is the angular velocity of the rotor field with respect to the rotor, then the angular velocity of the rotor, W, will tend to equal $W_s - W_r$. When that condition is satisfied the wound rotor motor operates as a synchronous machine. By advancing or retarding the phase of the rotor supply, the rotor field can be made to advance or retard slightly from its normal steady-state condition. The resulting interaction with the stator field will cause decelerating or accelerating torque to be developed and the rotor to change speed.

Several components of torque and power can be identified in the operation of the wound rotor motor 16. Neglecting losses, the power flow as seen by the system is the power crossing the air gap, $P_{ag}$, which is the sum of the mechanical power applied to the rotating masses, $P_m$, and the electrical power flowing in the rotor circuit, $P_e$. The slip, s, defined as difference in speed from synchronism divided by synchronous speed, is related to the power such that $P_e = s P_{ag}$.

Near synchronous speed, when s is near zero, $P_e$ is small compared to $P_m$. By being able to operate both above and below normal synchronous speed (as determined by line frequency), $P_e$ can be kept small. At the same time, the higher average speed requires less mechanical equipment size, since the higher average speed requires less mass to store an inertia a given amount of energy.

The cycloconverter 24 is a generally known type of apparatus for converting A.C. power of one frequency to A.C. power of a lower frequency and will not be detailed herein. It may comprise various types of elements but of particular interest are those using solid state components such as thyristors for the principal functional elements. A cycloconverter has means to modify each phase of the A.C. input while maintaining 120° between phases. It can be generally likened to three voltage-regulated thyristor dual converters, one for each phase. As a reference, each dual converter receives a low frequency voltage (occasionally a direct voltage) that is developed by a frequency control unit 30. Gradual changes in the reference frequency produce changes in the output frequency of the cycloconverter and, hence, the rotor magnetic field angular velocity is changed, rotor torque develops, rotor speed changes, power flows between the flywheel and the power system.

The magnitude of the power flow in the stator 17 is determined by the rate of change of frequency on the secondary 18. That secondary frequency can be run through zero and reversed in rotation to cause the rotor speed to move above and below synchronism. The voltage and power which the converter must supply is proportional to the maximum secondary frequency shift or the speed deviation from synchronism. Thus a tradeoff is permitted between the required size of the flywheel and the size and cost of the cycloconverter.

Figure 3:
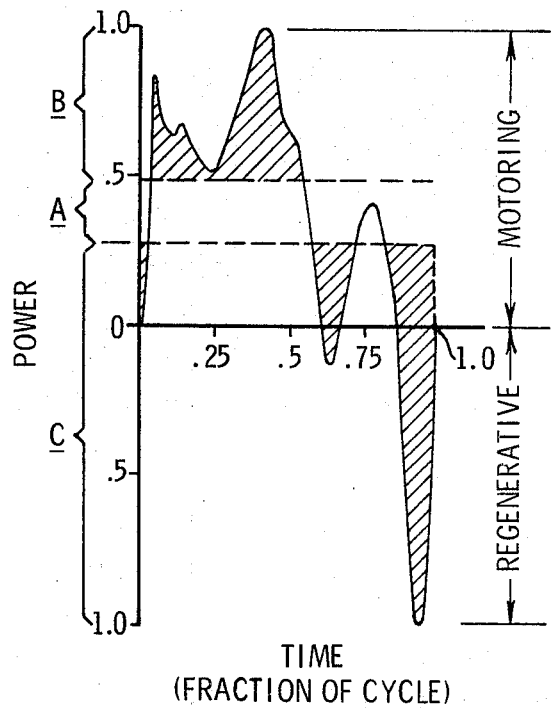
FIG. 3 is a curve showing the improvement achieved by the use of the present invention.

FIG. 3 shows the effect of the combination of the invention on the load curve. The overall shape of the curve is the same as in FIG. 1. Between certain levels of positive loading is a range A in which the power system 10 supplies the load 14 without energy being supplied or taken by the flywheel 22. The range A can be selected to limit the maximum power drawn from the system 10 to a value just above the average power, near half of peak motoring power. The lower end of range A can be chosen at about 0.3 peak motoring power to provide a relatively narrow range of demand on the power system 10, which can be readily handled by the system.

The cross-hatched areas of FIG. 3 are for periods in which energy transfer occurs between the power system 10 and flywheel 22 and the energy storage requirements of the flywheel are proportional to the cross-hatched area. In the range B, above A, power flows out of the flywheel 22 into the system 10 while in the range C, below A, power flows into the flywheel. The net energy flow over the entire cycle must be zero. The necessary peak power capability of the compensation system is proportional to the maximum absolute value of the difference between the base of a cross-hatched area and its associated load peak. In the example of FIG. 3, this occurs during maximum regeneration and is more than twice the power flow occurring during maximum motoring. The regenerative peak may be reduced by dissipating a portion of the regenerative power in resistors (not shown) connected to the phase conductors.

FIG. 2 omits for simplicity a number of elements that would normally be employed in accordance with common practice, such as circuit breakers in the connections between the various elements and resistors for interconnection with the rotor 18 for starting the motor 16.

In accordance with a preferred form of the present invention there are provided independent frequency and amplitude controls 30 and 32, respectively, for the cycloconverter 24. These controls 30 and 32 are essentially voltage regulators that may be constructed in accordance with known techniques. The frequency control 30 has applied to it as an input a speed signal developed, for example, by a tachometer 34 on the shaft 20. The speed signal should be one that is proportional to the difference of shaft speed from the synchronous speed of machine 16. The frequency control unit 30 also has applied to it a signal that is related to the power generated by system 10. The power signal may be developed by a current transformer 36 on one of the phase conductors. The amplitude control unit 32 has applied to it a signal related to the power factor or voltage on the stator 17 of machine 16. This signal may be developed, for example, by a current transformer 38 on a conductor connected between the machine 16 and the power system.

Recognizing that the magnitude of rotor current controls mainly the power factor, the magnitude is held to provide either constant power factor or constant voltage as desired by means of amplitude control unit 32.

The rate of change of speed or frequency controls the power flow, so the rotor frequency is controlled by a power regulator, part of frequency control unit 30, sensing and correcting for the excess line power over the established limits by current transformer 36.

Such a power regulator may tend to oscillate at the system natural frequency determined by the flywheel inertia and machine synchronizing power. This tendency is due to any phase lags in the regulator or machine time constant which give a component of torque in phase with velocity. A speed regulating signal from tachometer 34 is superimposed on the power error signal to give a component of torque in phase opposition to velocity to eliminate hunting. This at the same time would tend to bring the average speed back to the synchronous speed of the machine. This would provide positive damping and at the same time keep the flywheel returning to the middle of the speed range so as to be ready to pick up either a positive or negative power swing with a minimum deviation in speed and minimum voltage demand on the cycloconverter.

I claim:

1. In combination: an induction dynamoelectric machine with a stator and a rotor and windings on each of said stator and said rotor; a mechanical energy storage device mechanically connected with said rotor; a cycloconverter electrically connected with selected ones of said windings to control speed of rotation of said rotor and electrical-mechanical energy transfer between said energy storage device and said windings on said stator.

2. The subject matter of claim 1 further comprising: an alternating current power system connected with said stator windings and with an electrical load that normally pulsates over its duty cycle, said dynamoelectric machine transferring energy between said mechanical energy storage device and said power system to maintain actual power demand on said system within limits that are narrow compared with the load pulsations.

3. The subject matter of claim 2 wherein: said pulsating load duty cycle has both motoring and regenerative load portions; said mechanical energy storage device is a flywheel; and said cycloconverter comprises solid state switching elements and has independent frequency and current amplitude control units associated therewith.

4. The subject matter of claim 2 wherein: a frequency control unit is associated with said cycloconverter to regulate the frequency applied to said motor windings in accordance with power developed by said power system and with the speed of said rotor.

* * * * *